(12) United States Patent
Amerling et al.

(10) Patent No.: US 10,150,549 B1
(45) Date of Patent: Dec. 11, 2018

(54) COWLINGS FOR MARINE ENGINES AND METHODS FOR MAKING COWLINGS FOR MARINE ENGINES

(71) Applicant: Brunswick Corporation, Mettawa, IL (US)

(72) Inventors: Steven J. Amerling, Fond du Lac, WI (US); Brad J. VanRuiswyk, Waupun, WI (US); Timothy J. Eddy, Oshkosh, WI (US)

(73) Assignee: Brunswick Corporation, Mettawa, IL (US)

(*) Notice: Subject to any disclaimer, the term of this patent is extended or adjusted under 35 U.S.C. 154(b) by 0 days.

(21) Appl. No.: 15/888,463

(22) Filed: Feb. 5, 2018

(51) Int. Cl.
| | |
|---|---|
| *B63H 20/32* | (2006.01) |
| *B63H 21/36* | (2006.01) |
| *B29C 45/00* | (2006.01) |
| *B29C 51/08* | (2006.01) |
| *B29C 65/48* | (2006.01) |
| *B29L 31/00* | (2006.01) |
| *B29K 67/00* | (2006.01) |
| *B29K 509/02* | (2006.01) |
| *B29K 509/08* | (2006.01) |

(52) U.S. Cl.
CPC ......... *B63H 20/32* (2013.01); *B29C 45/0053* (2013.01); *B29C 51/08* (2013.01); *B29C 65/48* (2013.01); *B29K 2067/00* (2013.01); *B29K 2509/02* (2013.01); *B29K 2509/08* (2013.01); *B29L 2031/7502* (2013.01)

(58) Field of Classification Search
CPC ............... B63H 20/32; B63H 2020/32; B63H 2020/323; F02B 61/045; F02B 77/11
USPC ....................................................... 440/76, 77
See application file for complete search history.

(56) References Cited

U.S. PATENT DOCUMENTS

| | | | | |
|---|---|---|---|---|
| 4,878,468 A | * | 11/1989 | Boda .................. | B63H 20/32 123/195 P |
| 5,120,248 A | * | 6/1992 | Daleiden ............ | B63H 20/32 292/202 |
| 9,216,805 B1 | * | 12/2015 | Amerling ............ | B63H 20/32 |
| 9,580,943 B1 | | 2/2017 | Amerling et al. | |
| 9,580,947 B1 | | 2/2017 | Amerling et al. | |
| 10,005,534 B1 | * | 6/2018 | Amerling ............ | B63H 20/32 |
| 2012/0234850 A1 | * | 9/2012 | Picard ................ | B65D 43/162 220/833 |

OTHER PUBLICATIONS

Unpublished U.S. Appl. No. 15/413,793, filed Jan. 24, 2017.

* cited by examiner

*Primary Examiner* — Daniel V Venne
(74) *Attorney, Agent, or Firm* — Andrus Intellectual Property Law, LLP

(57) ABSTRACT

A cowling for a marine engine has an outer shell and a supporting structure bonded to an interior surface of the outer shell. The supporting structure has an elongated member that extends along the interior surface and provides rigidity to the outer shell. The supporting structure comprises a plurality of flex joints that are spaced apart along the elongated member and allow the supporting structure to flex transversely to the elongated member and thus follow a contour of the interior surface during bonding to the outer shell. Corresponding methods are disclosed.

20 Claims, 6 Drawing Sheets

COWLINGS FOR MARINE ENGINES AND METHODS FOR MAKING COWLINGS FOR MARINE ENGINES

FIELD

The present disclosure relates to marine engines, and particularly to cowlings for marine engines.

BACKGROUND

The following U.S. patents are incorporated herein by reference:

U.S. patent application Ser. No. 15/413,793 discloses an assembly for aligning and stabilizing first and second cowl portions on a marine engine. The assembly has an engagement member fixed to the first cowl portion and a retainer apparatus fixed to the second cowl portion. The retainer apparatus receives the engagement member when one of the first cowl portion and second cowl portion are towards each other. The retainer apparatus has a retainer body and opposing guide members that are pivotable with respect to the retainer body. As the retainer apparatus receives the engagement member, the engagement member engages and causes the guide members to pivot with respect to the retainer body such that the engagement member becomes sandwiched between the guide members, thus aligning and stabilizing the first and second cowl portions.

U.S. Pat. No. 9,216,805 discloses a cowl mounting system that includes stabilizer fulcrums spaced between front and rear cowl mounts and preloading the cowl to provide cowl stability in the mounted condition. The stabilizer fulcrums also provide port and starboard alignment guides during assembly.

U.S. Pat. No. 9,580,943 discloses a latching device for a cowl on an outboard marine engine, the cowl having first and second cowl portions that are separated from each other in an open cowl position and that are latched together by the latching device in a closed cowl position. A retainer is adapted to be fixed to the first cowl portion and a latch is adapted to be fixed to the second cowl portion. The latch is movable into and between a latched position in which the latch is latched to the retainer and an unlatched position in which the latch is unlatched from the retainer. The latch comprises an engagement member, a bell crank, and a spring that is coupled to the engagement member and the bell crank. Movement of the bell crank with respect to the engagement member generates an over-center force on the engagement member that facilitates latching and unlatching of the engagement member and the retainer.

U.S. Pat. No. 9,580,947 discloses a cowl for an outboard marine propulsion device having an internal combustion engine. The cowl comprises a first cowl portion; a second cowl portion that mates with the first cowl portion to enclose the internal combustion engine; a service door on the second cowl portion, wherein the service door is position-able in an open position and in a closed position; and a carrying handle on the second cowl portion, wherein the carrying handle is accessible when the service door is in the open position and inaccessible when the service door is in the closed position. A plurality of latches is spaced apart around the perimeter. The latches latch the second cowl portion to the first cowl portion. An actuator assembly actuates each of the plurality of latches. The actuator assembly can be actuated by movement of the carrying handle.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain examples disclosed herein, a cowling for a marine engine has an outer shell and a supporting structure bonded to an interior surface of the outer shell. The supporting structure has an elongated member that extends along the interior surface and provides rigidity to the outer shell. The supporting structure further has a plurality of flex joints that are spaced apart along the elongated member and allow the supporting structure to flex transversely to the elongated member, and thus follow a contour of the interior surface during bonding to the outer shell. Corresponding methods are disclosed.

DETAILED DESCRIPTION OF THE DRAWINGS

Figure 1:
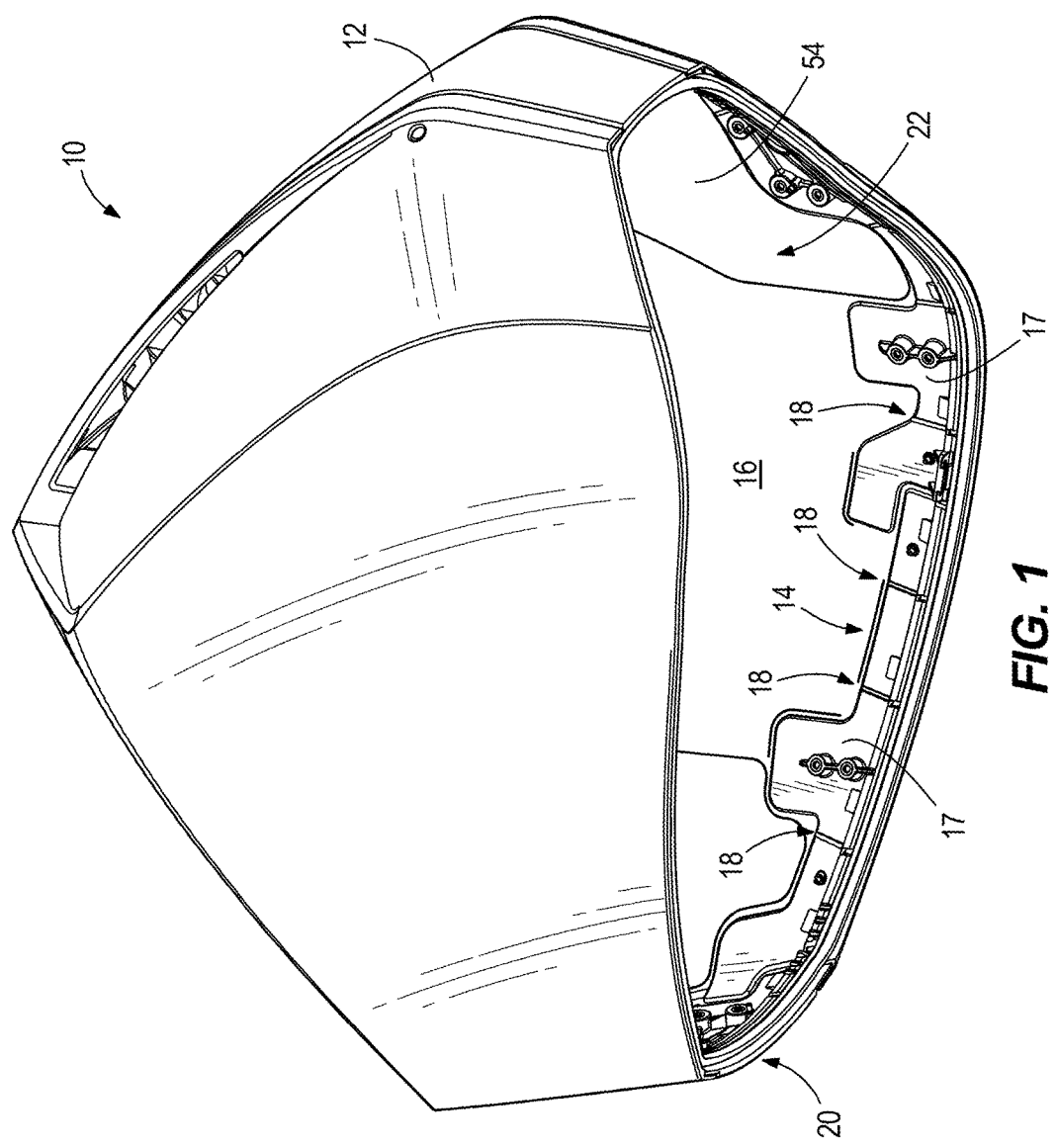
FIG. 1 is a perspective view of a top cowling for an outboard motor, the top cowling having an outer shell and a supporting structure bonded to an interior surface of the outer shell.

FIG. 1 depicts a top cowling 10 for an outboard marine engine. The top cowling 10 has an outer shell 12 and an inner supporting structure 14 that is bonded to the interior surface 16 of the outer shell 12. The outer shell 12 provides what is referred to in the art as a "class A" surface, which is formed from a sheet molding compound such as a polyester resin having calcium carbonate with glass beads or strands. According to conventional molding methodology, the outer shell 12 is formed with a heated tool into which the sheet molding compound is loaded. In some examples, the sheet molding compound is first fed through a machine that uses a scale to weigh out a predetermined amount of the material and then uses a cutting device to cut the material into smaller portions. The portions are placed into the heated tool, wherein molds come together and apply heat and pressure, which melts the sheet molding compound into the form of the outer shell 12. This provides an outer shell having a very predictable shape with good tolerances; however the resulting outer shell is also not very rigid or resilient.

The supporting structure 14 on the other hand is quite rigid and resilient because it is made by injection molding. One example is a nylon injection molding process whereby pellets are ground up and squirted into a molding tool, which applies heat and pressure. The resulting part is quite rigid; however the resulting part can easily become warped as a result of the relatively high shrink rate of the material as the part changes from a liquid to a solid. Inaccuracies in the resulting part can also occur because of glass orientation in the materials and the relatively violent way in which the materials are injected into the tool. In general, it is difficult to form the supporting structure 14 within tight tolerances by the injection molding process. The resulting part often is slightly mis-sized or mis-shaped.

The supporting structure 14 is then bonded to the interior surface 16 of the top cowling 10 by glue or other suitable fixing compound. Through research and experimentation, the present inventors have determined that it can be very difficult to accurately bond the mis-sized or mis-shaped, rigid, injection-molded supporting structure 14 to the top cowling 10 in a manner that does not cause warpage of the top cowling 10. Because of the variability in size and shape of injection molded parts, the relatively rigid supporting structure 14 does not always follow the desired profile of the top cowling 10 and thus when it is bonded to the top cowling 10 it can cause the top cowling to warp. This negatively impacts the resulting product, for example causing a top cowling 10 that is mis-shapen and possibly not connectable to a lower cowling in a water-tight manner. The present inventors have thus sought to provide an improved process for forming cowlings, such as the top cowling 10 depicted in FIG. 1. The present disclosure is a result of these efforts.

Figure 2:
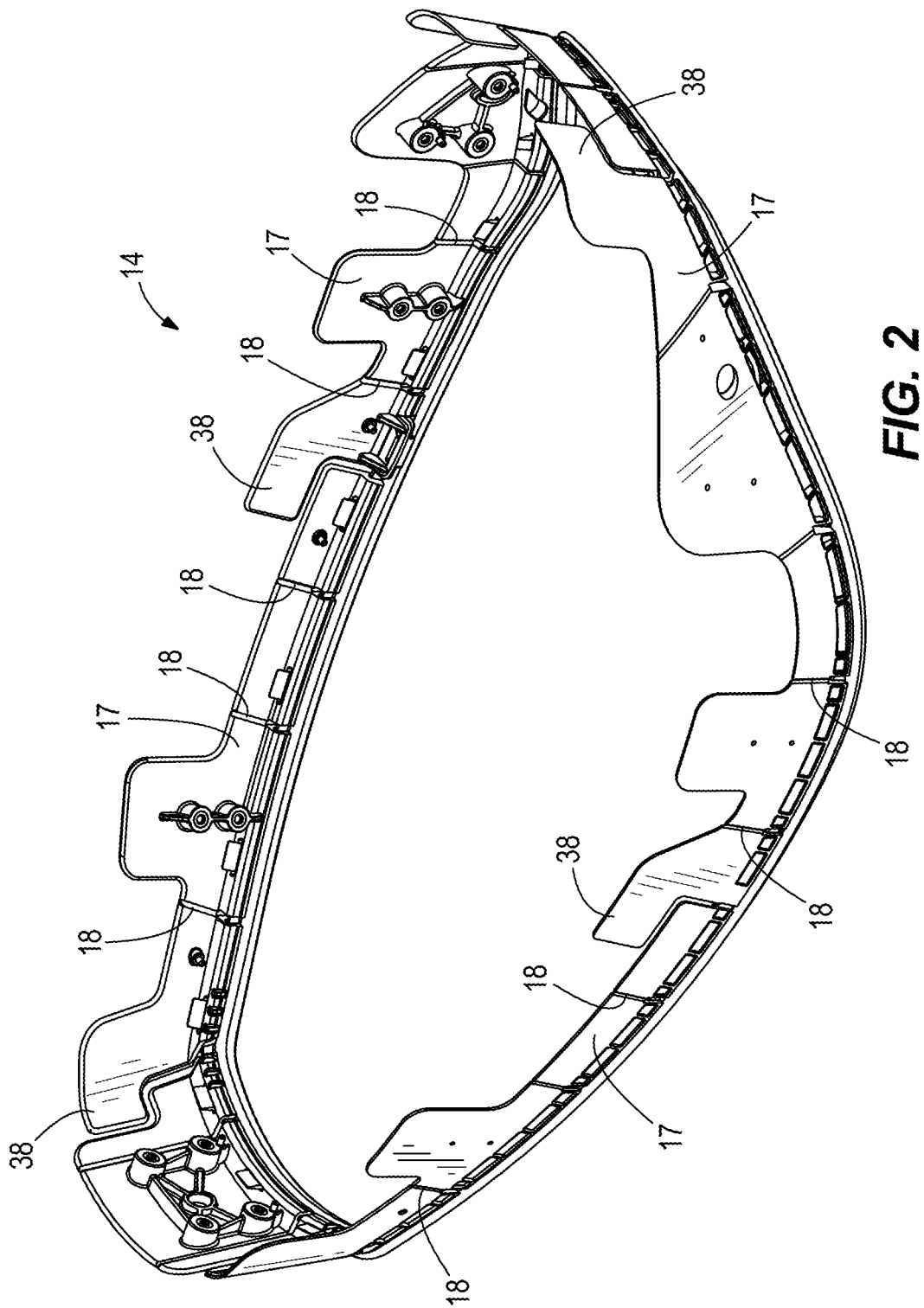
FIG. 2 is a perspective view of the supporting structure.

Referring to FIGS. 1 and 2, the supporting structure 14 is made of a series of elongated members 17 that extends along the interior surface 16 and, as described above, provides rigidity to the outer shell 12. Each elongated member 17 is an injection molding part having a plurality of flex joints 18 that are spaced apart from each other along the elongated member 17. Each flex joint 18 allows the respective elongated member 17 to flex in directions that are transverse to the elongated member 17, including bending in or out along the length of the elongated member 17 and/or bending up or down along the length of the elongated member 17. This added flexibility advantageously allows the supporting structure 14 to better follow the contour of the interior surface 16 during its bonding to the outer shell 12.

As shown in FIGS. 1 and 2, the outer shell 12 has a perimeter edge 20 which, in this example, is a lower edge of the top cowling 10 that is configured to engage with a corresponding upper perimeter edge 52 (see FIG. 5) of a bottom cowling 50, so as to enclose the marine engine within the cowl interior 22. The supporting structure 14 extends along the entirety of the interior surface 16 at a location that is adjacent to the perimeter edge 20, as shown.

Figure 3:
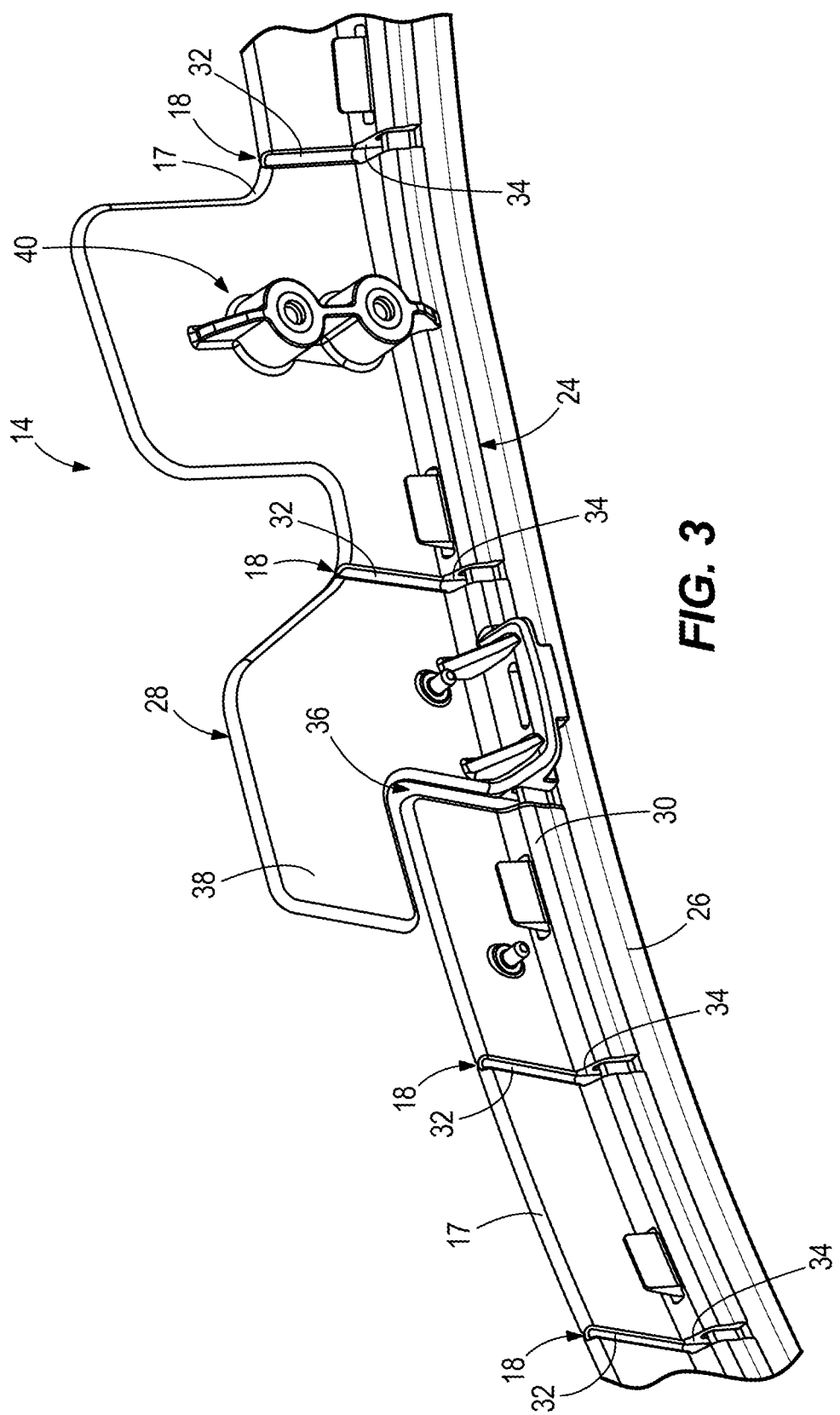
FIGS. 3 and 4 are partial views of the supporting structure.
Figure 4:
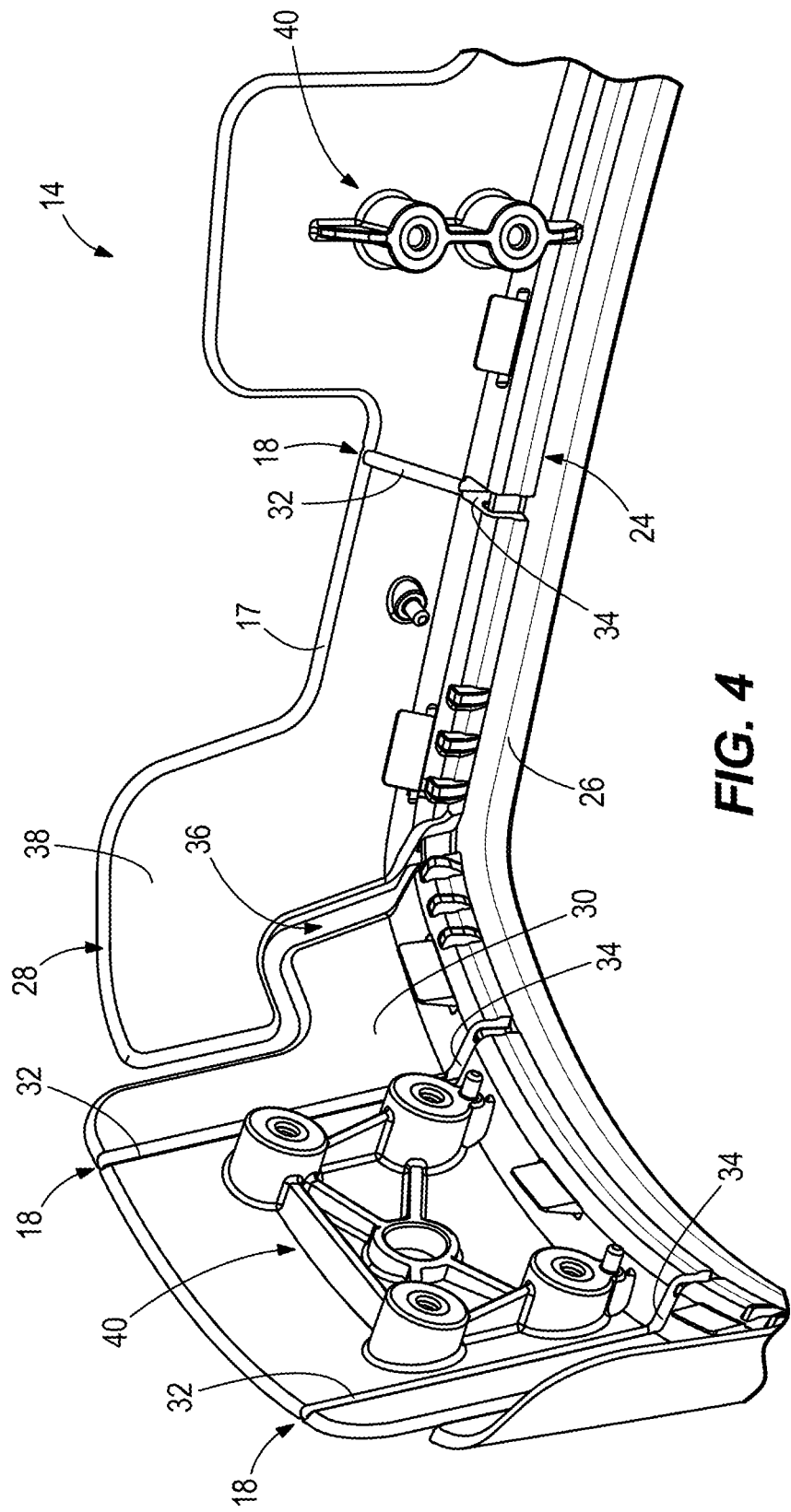

Referring to FIGS. 2-4, the supporting structure 14 has a lower abutment surface 24 that faces the perimeter edge 20 and supports and is engaged by a perimeter seal 26, which will be further described herein below with reference to FIGS. 5-7. The supporting structure 14 is made up of the plurality of elongated members 17, each extending between a first end 28 and an opposite, second end 30. Each flex joint 18 extends transversely with respect to the respective elongated member 17 and has a thickness (depth towards the interior surface 16) that is less than the thickness (depth) of the remainder of the elongated member 17. That is, referring to FIGS. 3 and 4, each flex joint 18 has an area of reduced thickness 32 (depth) that extends transversely with respect to the respective elongated member 17. Each flex joint 18 also has a gap 34 formed through the elongated member 17 at a location that is adjacent to (in the Figures, it is below) the area of reduced thickness 32. Thus, the gap 34 is located between the area of reduced thickness 32 and the perimeter edge 20 of the outer shell 12. Each elongated member 17 and respective flex joints 18 form a monolithic component, so that the bonding material can be evenly applied between the elongated member 17 and interior surface 16 along the entire length of the elongated member 17, including the locations of the flex joints 18. This provides a strongly reinforced connection and component. The perimeter seal 26 extends across (bridges) the gap 34 and extends along the abutment surface 24 of the elongated member 17 and optionally across adjacent elongated members 17 in the series, thus providing an effective water-tight seal along the entire length of the supporting structure 14.

Referring to FIGS. 3 and 4, each elongated member 17 extends between the first end 28 and second end 30. An axially facing recess 36 is formed at the first end 28 and is sized to receive the second end 30 of an adjacent elongated member 17, as shown. The recess 36 registers the first end 28 with the second end 30 of the adjacent elongated member 17 so that the plurality of elongated members 17 are connected together in a chain that extends completely around the perimeter edge 20. The recess 36 is formed by an L-shaped projection 38 that extends upwardly away from the perimeter edge 20 and functionally prevents misalignment of the first end 28 and second end 30 of respective adjacent elongated members 17 during bonding thereof to the interior surface 16.

The supporting structure 14 further includes a plurality of mounting surfaces, e.g., bosses 40, which are configured for mounting of stabilizing features of the top cowling 10, for example for stabilizing the top cowling 10 with respect to the adjacent lower cowling or separating the top cowling 10 from a supporting surface, all as described in the above incorporated U.S. patent application Ser. No. 15/413,793.

The resulting top cowling 10 having the outer shell 12 and supporting structure 14 with flex joints 18, as described herein, provides a relatively strong cowling configuration compared to the prior art including a supporting structure 14 that better conforms to the final intended surfaces of the top cowling 10 during assembly and bonding, thus providing an improved final product.

It will thus be understood that the present disclosure provides a method of making a cowling for a marine engine that includes forming an outer shell 12, forming a supporting structure 14 having a plurality of elongated members 17 each having a plurality of flex joints 18 that are spaced apart along the respective elongated member 17 and allow the respective elongated member 17 to flex in a direction that is transverse to the elongated member 17 (e.g. in and out). Next, the supporting structure 14 is bonded to the interior surface 16 of the outer shell 12 so that the supporting structure 14 provides rigidity to the outer shell 12. During the bonding the flex joints 18 allow the supporting structure 14 to flex and thus nicely follow a contour of the interior surface 16 during bonding to the outer shell 12. The supporting structure 14 is bonded to the interior surface 16 at the location that is adjacent to the perimeter edge 20 of the outer shell 12, which is configured to engage with an adjacent cowling so as to enclose the noted marine engine. The perimeter seal 26 is installed along the supporting structure 14 for sealing with the adjacent cowling portion, as will be described further herein below. Each flex joint 18 is formed during the injection molding process to have a thickness that is less than a thickness of the remainder of the elongated member 17. In preferred examples, the outer shell 12 is formed from a sheet molding compound and the supporting structure 14 is formed via injection molding. The supporting structure 14 is bonded to the outer shell 12 with glue or any other suitable bonding material.

Figure 5:
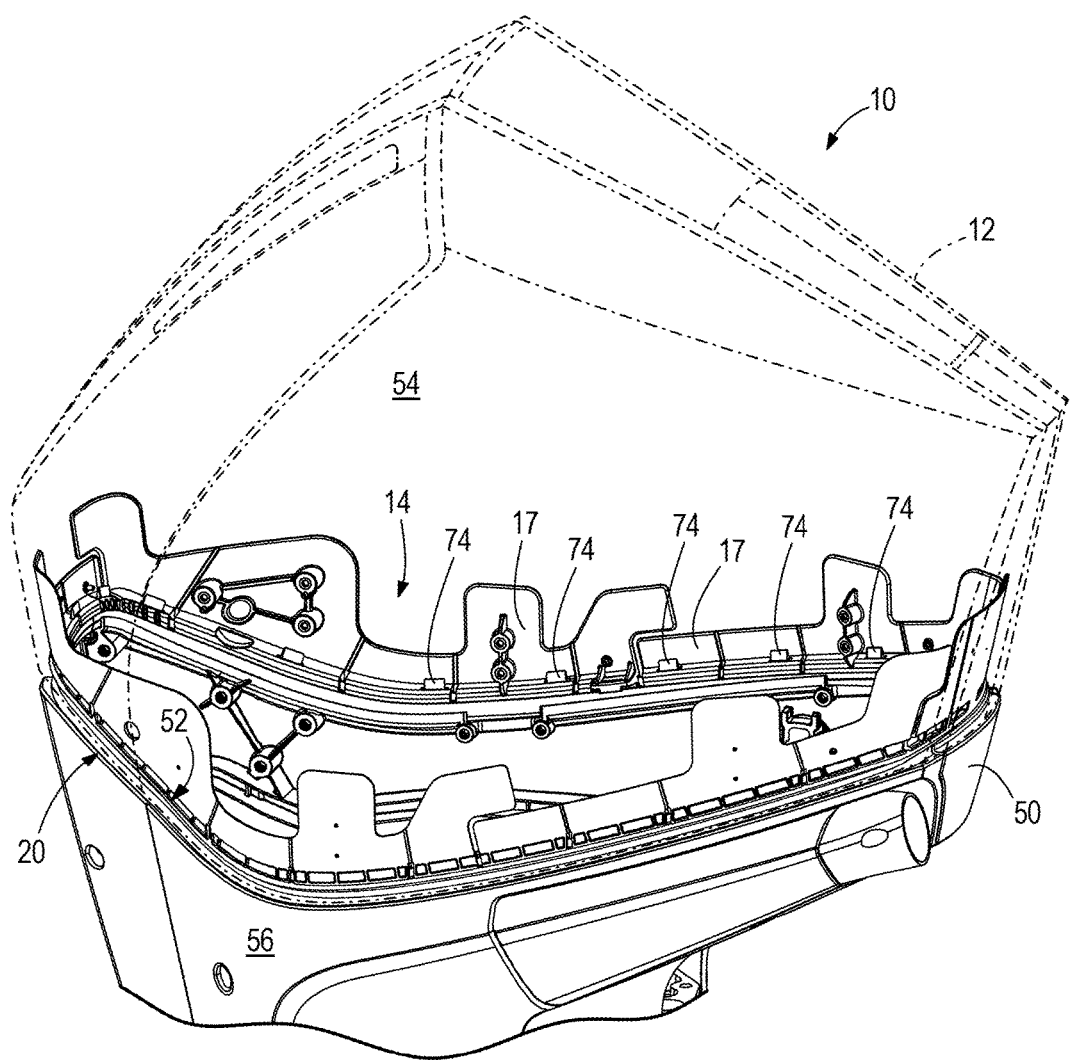
FIG. 5 is a view of the top cowling and a lower cowling for the outboard motor, showing internal components of the top and lower cowlings in phantom line.
Figure 6:
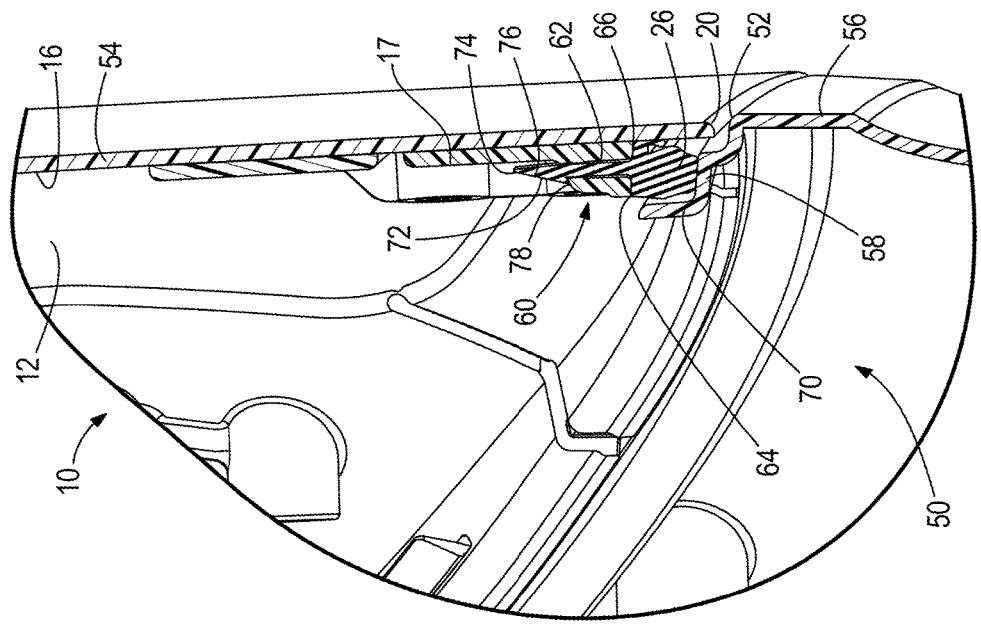
FIG. 6 is a view of section 6-6, taken in FIG. 5.
Figure 7:
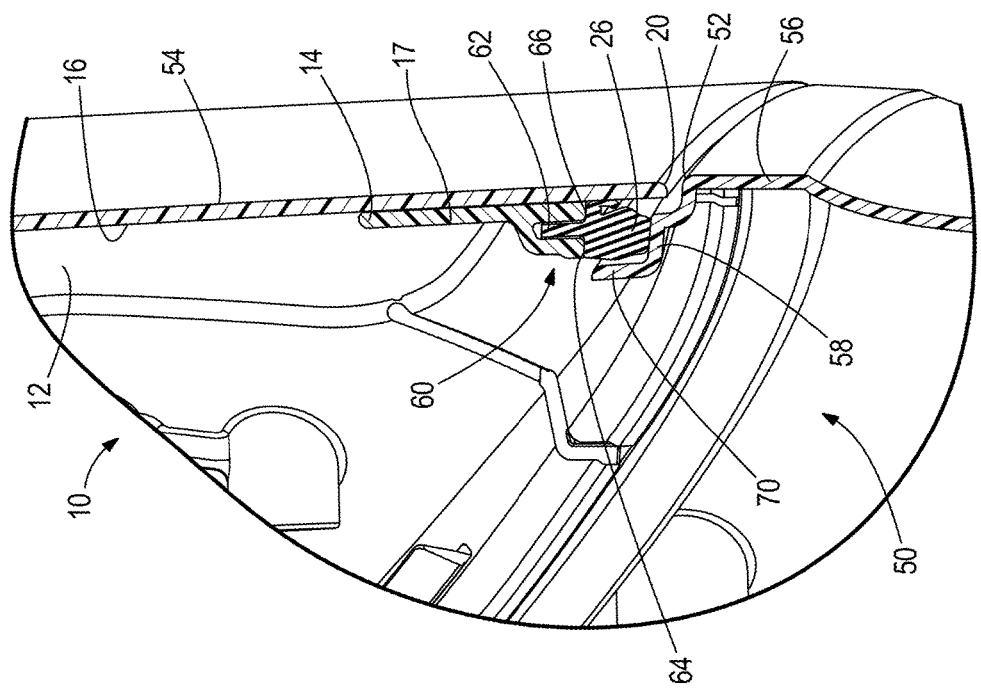
FIG. 7 is a view of section 7-7, taken in FIG. 5.

Referring now to FIGS. 5-7, the top cowling 10 is configured for attachment to a bottom cowling 50 along perimeter edges 20, 52 so as to enclose the marine drive. As described further herein below, the perimeter seal 26 is axially sandwiched between the top cowling 10 and the bottom cowling 50 in a manner that effectively prevents ingress of water into the cowl interior 22. The perimeter seal 26 is retained on the top cowling 10 and is axially compressed against the perimeter edge 52 of the bottom cowling 50 when the top cowling 10 is axially mated with the bottom cowling 50, as shown.

Referring to FIGS. 6 and 7, the top cowling 10 and bottom cowling 50 each have side walls 54, 56 that extend towards and face each other at respective perimeter edges 20, 52 when the top cowling 10 is mated to the bottom cowling 50. The side walls 54, 56 together define a radially outer extent of the cowl interior 22 in which the marine drive is disposed. The bottom cowling 50 includes a base surface 58 that extends along the perimeter edge 52 and projects transversely with respect to the perimeter edge 52, towards the cowl interior 22. The perimeter seal 26 is compressed against the base surface 58 when the top cowling 10 is mated with the bottom cowling 50. On the interior surface 16 of the top cowling 10, the supporting structure 14 provides a base surface 60 that extends along the perimeter edge 20 and projects transversely to the perimeter edge 20 towards the cowl interior 22. The perimeter seal 26 is axially compressed against and between the respective base surfaces 58, 60 when the top cowling 10 is mated with the bottom cowling 50.

The perimeter seal 26 is retained in a channel 62 formed through the base surface 60 of the supporting structure 14. Thus, the base surface 60 is formed by radially inner and outer base surface portions 64, 66 that extend along the perimeter edge 20, on radially opposite sides of the perimeter seal 26, respectively. The perimeter seal 26 is axially sandwiched on its bottom surface by the base surface 58 and on its top surface by the inner and outer base surface portions 64, 66. The perimeter seal 26 also has a radially outer surface located between the top and bottom surfaces. The radially outer surface abuts the interior surface 16 of the outer shell 12. Optionally, an opposite inner surface of the perimeter seal 26 abuts an exterior surface 70 of the bottom cowling 50.

Referring to FIG. 7, a plurality of axial bores 72 are formed through the inner supporting structure and are spaced apart along the channel 62. The perimeter seal 26 includes a plurality of locking tabs 74 that extend upwardly through the axial bores 72 and lock the perimeter seal 26 in place with respect to the channel 62. Each tab 74 has a locking projection 76 that projects radially inwardly towards the cowl interior 22 and abuts a locking surface 78 on the supporting structure 14, which also projects radially inwardly towards the cowl interior 22. Referring to FIG. 6, when the cowl latching devices latch the top cowling 10 to the bottom cowling 50, all as described in the above-incorporated U.S. Pat. No. 9,580,943, the perimeter seal 26 is axially compressed between the top cowling 10 and the bottom cowling 50, thus efficiently forming a water resistant seal and protecting the marine engine from exterior elements.

In the present description, certain terms have been used for brevity, clearness and understanding. No unnecessary limitations are to be implied therefrom beyond the requirement of the prior art because such terms are used for descriptive purposes only and are intended to be broadly construed. The different systems, methods and apparatuses described herein may be used alone or in combination with other systems, methods and apparatuses. Various equivalents, alternatives and modifications are possible within the scope of the appended claims.

The invention claimed is:

1. A cowling for a marine engine, the cowling comprising an outer shell and a supporting structure bonded to an interior surface of the outer shell, wherein the supporting structure comprises an elongated member that extends along the interior surface and provides rigidity to the outer shell, wherein the supporting structure comprises a plurality of flex joints that are spaced apart along the elongated member and allow the supporting structure to flex transversely to the elongated member and thus follow a contour of the interior surface during bonding to the outer shell.

2. The cowling according to claim 1, wherein the outer shell comprises a perimeter edge configured to engage with an adjacent cowling so as to enclose the marine engine, wherein the supporting structure extends along the interior surface at a location that is adjacent to the perimeter edge.

3. The cowling according to claim 2, further comprising a seal that extends along the supporting structure and is configured to seal with the adjacent cowling.

4. The cowling according to claim 3, wherein the supporting structure further comprises an abutment surface that faces the perimeter edge and is engaged by the seal.

5. The cowling according to claim 2, wherein the elongated member extends between a first end and an opposite second end, and wherein each flex joint in the plurality of flex joints extends transversely with respect to the elongated member.

6. The cowling according to claim 5, wherein the elongated member has a thickness and wherein each flex joint has a thickness that is less than the thickness of a remainder of the elongated member.

7. The cowling according to claim 6, wherein each flex joint comprises an area of reduced thickness that extends transversely with respect to the elongated member.

8. The cowling according to claim 7, wherein each flex joint comprises a gap in the elongated member, the gap being located adjacent the area of reduced thickness.

9. The cowling according to claim 8, wherein the gap is between the area of reduced thickness and the perimeter edge of the outer shell.

10. The cowling according to claim 1, wherein the elongated member extends between a first end and an opposite, second end, and further comprising a recess formed in the first end, the recess being sized to receive a second end of an adjacent elongated member to thereby prevent misalignment of the first end and the second end of the adjacent elongated member during bonding to the interior surface.

11. The cowling according to claim 10, wherein the recess is formed by an L-shaped projection on the first end.

12. The cowling according to claim 1, wherein the supporting structure further comprises a plurality of mounting surfaces configured for mounting of stabilizing features of the cowling, for stabilizing the cowling with respect to an adjacent cowling.

13. The cowling according to claim 1, wherein the outer shell is formed from a sheet molding compound and the supporting structure is formed of injection-molding plastic.

14. The cowling according to claim 1, wherein the supporting structure is bonded to the outer shell by glue.

15. A method of making a cowling for a marine engine, the method comprising:
    forming an outer shell;
    forming a supporting structure having an elongated member and a plurality of flex joints that are spaced apart along the elongated member and allow the elongated member to flex in a direction that is transverse to the elongated member; and
    bonding the supporting structure to an interior surface of the outer shell so that the supporting structure provides rigidity to the outer shell, wherein during the bonding, the plurality of flex joints allow the supporting structure to flex and follow a contour of the interior surface during bonding to the outer shell.

16. The method according to claim 15, comprising bonding the supporting structure to the interior surface at a location that is adjacent to a perimeter edge of the outer shell that is configured to engage with an adjacent cowling so as to enclose the marine engine.

17. The method according to claim 16, comprising installing a seal along the supporting structure for sealing with the adjacent cowling.

18. The method according to claim 15, comprising forming each flex joint with a thickness that is less than a thickness of a remainder of the elongated member.

19. The method according to claim 15, comprising forming the outer shell from a sheet molding compound and forming the supporting structure from plastic via injection molding.

20. The method according to claim 19, comprising bonding the supporting structure to the outer shell with glue.

\* \* \* \* \*